United States Patent [19]
Phillipps et al.

[11] 3,891,631

[45] June 24, 1975

[54] PROCESS FOR PREPARING 17α-MONOESTERS OF 17α, 21-DIHYDROXY-20-OXO STEROIDS

[75] Inventors: Gordon Hanley Phillipps, Wembley; Brian MacDonald Bain, Chalfont St. Peter; Graham Durrant, London, all of England

[73] Assignee: Glaxo Laboratories Limited, Greenford, England

[22] Filed: Aug. 10, 1973

[21] Appl. No.: 387,487

[30] Foreign Application Priority Data

Aug. 11, 1972 United Kingdom............... 37655/72

[52] U.S. Cl.................... 260/239.55 R; 260/397.45
[51] Int. Cl.²........................................ C07C 173/00
[58] Field of Search............................... 260/397.45

[56] References Cited
UNITED STATES PATENTS

| | | | |
|---|---|---|---|
| 3,255,218 | 6/1966 | Herzog............................ | 260/397.45 |
| 3,755,302 | 8/1973 | Ercoli et al................. | 260/239.55 R |
| 3,780,177 | 12/1973 | Ercoli et al....................... | 424/243 |

Primary Examiner—Elbert L. Roberts
Attorney, Agent, or Firm—Bacon & Thomas

[57] ABSTRACT

The specification describes a process for preparing 17α-carboxylate or neutral phosphate or carbonate esters of 17α-21-dihydroxy-20-oxo steroids wherein a 21-carboxylate or neutral phosphate or carbonate ester of a 17α,21-dihydroxy-20-oxo-steroid is treated with a non-hydroxylic base in an anhydrous aprotic medium to remove a proton selectively from the 17α-hydroxyl grouping, and the reaction mixture neutralised or acidified whereby the intermediate product is protonated. The base used in the process can be for example a carbanionoid e.g. alkali metal alkyl, or metal amide, e.g. alkali metal amide, base. The process is applicable to the preparation of a wide variety of 17-esters of the above-mentioned type. The process can also be used to prepare certain enol-aldehydes corresponding to the above-described 17-ester, a particular class of these enol-aldehydes being described in the specification as novel compounds.

23 Claims, No Drawings

PROCESS FOR PREPARING 17A-MONOESTERS OF 17A, 21-DIHYDROXY-20-OXO STEROIDS

This invention is concerned with improvements in or relating to the preparation of 17α-esters of 17α,21-dihydroxy-20-oxo steroids.

17α-esters of 17α, 21-dihydroxy-20-oxo steroids are of considerable interest, a number of such compounds having for example been found to possess high topical anti-inflammatory activity, particularly in the pregnane series. These 17-esters are however not capable of being prepared by normal direct esterification techniques without simultaneous esterification of the 21-hydroxy group due, probably, to the hindered nature of the hydroxy group at position-17.

Some 17α-monoesters of the type referred to may be prepared by careful hydrolysis of appropriate 17, 21-diesters or alternatively from the parent 17α, 21-diols by first forming an orthoester which is thereafter converted to the desired 17α-monoester. These latter procedures are described for example in British Patents 1,043,347 and 1,047,518.

While conducting research in regard to reactions at other parts of the steroid molecule, we have discovered that treatment of a 21-ester of a 17α, 21-dihydroxy-20-oxo steroid with a base, as more particularly described hereinafter, surprisingly effects migration of the ester group at the 21-position to the 17α-position, apparently by initial removal of a proton from the 17α-hydroxyl group, thus enabling 17α-esters of 17α, 21-dihydroxy-20-oxo steroids to be readily obtained, ofter in good yield.

According to one feature of the present invention we provide a process for the preparation of 17α-carboxylate or neutral phosphate or carbonate esters of 17α, 21-dihydroxy-20-oxo steroids which comprises reacting a 21-carboxylate or neutral phosphate or carbonate ester of a 17α, 21-dihydroxy-20-oxo-steroid with a non-hydroxylic base in an anhydrous aprotic medium to remove a proton selectively from the 17α-hydroxyl grouping without elimination of the 17α-oxygen function, and subsequently neutralising or acidifying the reaction mixture whereby the intermediate product is protonated to produce the desired 17α-ester.

Preferred bases for use in the process according to this invention can be found in particular among the carbanionoid bases and metal amide bases. The base chosen must, of course, be a strong enough base to effect the state proton removal from the 17α-hydroxyl group. Carbanionoid bases include, for example, metal alkyls such as lithium diloweralkyl cuprates (e.g. lithium dimethyl cuprate), lithium loweralkyl loweralkoxy cuprates (e.g. lithium methyl-tert-butoxy cuprate), lithium loweralkyl cyano cuprates (e.g. lithium methyl cyano cuprate), alkali metal (e.g. lithium triloweralkyl cobalts (such as lithium trimethyl cobalt), alkali metal (e.g. lithium) triloweralkyl manganese (such as lithium trimethyl manganese) and loweralkyl lithiums e.g. methyl lithium and n-butyl lithium. Metal, in particular alkali metal, amide bases include alkali metal bis-(triloweralkyl-silyl)amides, e.g. lithium or sodium bis-(triloweralkyl-silyl)amides such as lithium bis-(trimethyl-silyl)amide or sodium bis-(trimethyl-silyl) amide; and alkali metal amides carrying one or two N-substituents which may be alkyl (e.g. $C_{1-8}$alkyl) or cycloalkyl (e.g. $C_{5-10}$ cycloalkyl) groups or may together with the nitrogen atom form a saturated heterocyclic ring, which may, if deisred carry one or more alkyl groups, the α-carbon atoms of the ring being preferably secondary or teriary; suitable amides are lithium diethylamide, lithium N-isopropylcyclohexylamide, lithium dicyclohexylamide, lithium 2,2,6,6-tetramethylpiperidide and lithium di-isopropylamide. Lithium bases are generally preferred.

The above mentioned lower alkyl and alkoxy groups may contain for example 1 to 6 carbon atoms. Alcoholate and phenolate bases can also be employed in the process according to the invention, examples of such bases including sodium or potassium alkoxides, especially tertiary alkoxide such as potassium tert-butoxide.

In general, the bases employed in the process of the invention are preferably ones which are strongly hindered except for the carbanionoid bases.

It will be appreciated that the base may, in some cases, alter the nature of the ester group from that originally present at the 21-position. For example, we have found that treatment of betamethasone 21-trichloroacetate with lithium dimethyl cuprate can yield a product which is a mixture of esters wherein the chlorine atoms present in the ester residue have themselves suffered replacement, the product indeed comprising in general the 17-2′, 2′-dichloropropionate and the 2′-chloroisobutyrate. These two products, as will be appreciated, are however still "17α-esters".

The anhydrous aprotic medium advantageously comprises cyclic and/or acyclic ether solvents such as tetrahydrofuran, 1,2-dimethoxyethane, dioxan and/or diethylether.

The optimum temperature for the base-treatment depends upon the base employed and the nature of the starting material and can be readily determined by preliminary experiment. However, the reaction temperature will generally be below ambient temperature and temperatures as low as −60°C can be used, if desired. With suitable choice of solvent, and with more reactive bases and/or steroid substrates, even lower temperatures may be desirable.

We have found that in some instances unless the reaction temperature (and other conditions) are suitably adjusted, the reaction proceeds further with elimination of the 17α-oxygen function and the formation of an enol aldehyde, namely a compound having the following partial formula at the 17-position:

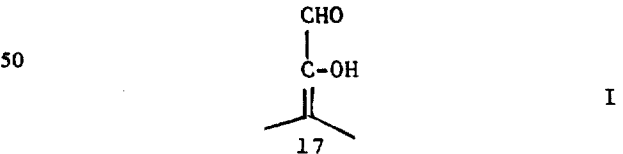

Those enol-aldehydes of partial formula I containing a β-methyl group in the 16-position are new compounds and consitute a further feature of the present invention.

The above-identified new enol-aldehydes according to the present invention are useful as intermediates in the synthesis of analogous steroid compounds, e.g. by reduction to compounds such as the corresponding 17α-H-21-hydroxy-20-ketones which have anti-inflammatory activity.

Particularly preferred enol-aldehydes according to the present invention include those of general formula

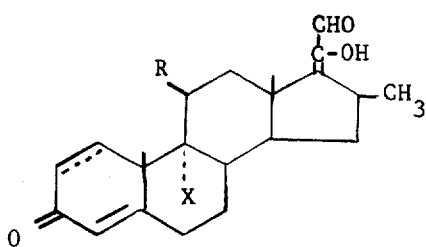

wherein R presents a β-hydroxy or oxo group, X represents a chlorine or fluorine atom, and —— represents a single or double bond; and a preferred enol-aldehyde is 9α-fluoro-11β20-dihydroxy-16β-methyl-3-oxo-pregna-1,4,17(20)triene-21-al.

It is believed that the formation of the above enol aldehydes represents a further reaction upon the 17α-ester or an earlier reaction intermediate which is obtained by the above-described procedure, which further reaction may be prevented or reduced by the use of lower temperatures or shorter reaction times. If desired however, a 17α-ester previously isolated may be subjected to base treatment to yield such a corresponding enol aldehyde.

It should be noted that the above enol aldehydes may be produced directly from the 21-ester of a 17α,21-dihydroxy steroid by treatment with the base under slightly more vigorous conditions. Alkali metal hydrides, e.g. sodium hydride, and alcoholate or phenolate bases e.g. sodium or potassium alkoxides such as potassium t-butoxide are particularly useful in this respect. This reaction is presumed to proceed via the previously described 17α-esters. Under carefully controlled conditions such bases, for example potassium t-butoxide, yield the desired 17α-esters without such further conversion.

In the case of the reaction of sodium bis-(trimethylsilyl)amide with betamethasone 21-valerate, the desired 17α-ester was formed at −40°C but at room temperature over about 30 minutes the product was the corresponding enol-aldehyde.

As is well known in the art of steroid chemistry, in any given case the extent of the reaction may be assessed by conventional means, for example thin-layer chromatography and suitable conditions readily found in any given case. In case of doubt, again as is well known, products formed in the process according to the invention may be readily identified, for example by infra-red spectroscopy and proton magnetic resonance spectroscopy.

The neutralisation or acidification of the reaction mixture in the process according to the invention facilitates protonation of the intermediate product of the reaction between the steroid substrate and the base in order to generate the desired 17α-ester. It is generally preferred to effect the neutralisation or acidification of the reaction mixture in an anhydrous medium, e.g. using anhydrous acetic acid,p-toluenesulphonic acid or N,N,N' , N'-tetramethylethylene diammonium tetrachloro cuprate (II), to reduce the possibility of hydrolysis or rearrangement of the 17α-ester. Whether or not any particular base shows a tendency to effect such unwanted reactions under aqueous conditions can be readily determined by preliminary experiment. Once the reaction mixture has been neutralised or acidified, water is preferably added to further facilitate the isolation of the desired 17α-ester. The neutralisation of acidification of the reaction mixture can, however, be effected in aqueous medium, e.g. an aqueous acid such as 2N-sulphuric acid, or an aqueous ammonium salt such as ammonium chloride, particularly where a carbanionoid or metal amide base is used.

In general, the reaction is of application to the conversion of the specified 21-esters of 17α,21-dihydroxy-20-oxo steroids at large, especially those of the pregnane series. Such compounds may carry various substituents as for example hydroxy groups or oxo-groups or protected hydroxy or oxo groups at positions 3- and/or b 11-; alkyl (e.g. methyl) groups and/or halogen (e.g. chlorine or fluorine) atoms at positions 2- and/or 6-; halogen atoms at the 9αand/or 11β-positions or 9α, 12α-positions, e.g. fluorine, chlorine or bromine atoms; alkyl (e.g. methyl) groups at the 16-position, which alkyl groups may, if desired, be substituted e.g. by a chlorine or fluorine atom; or an alkylidene (e.g. methylene) group at the 16-position, which alkylidene group may, if desired, be substituted, e.g. by a bromine, chlorine or fluorine atom; alkyl, e.g. methyl, groups at the 10-, 13- and/or 21-positions.

The above-mentioned protected hydroxy groups may be for example esterified or etherified hydroxy groups such as alkoxy, cycloalkoxy, aralkoxy, aryloxy groups or aliphatic, araliphatic or aromatic acyloxy groups; the protected oxo groups may be for example ketal groups. In general, aliphatic substituents and the aliphatic portions of araliphatic substituents preferably contain 1–6 carbon atoms; aromatic groups are preferably monocyclic.

Unsaturation may be present, for example at the 1-, 3-, 4-, 5-, 6-, 7-, 8- and/or 9-positions and/or at the 15-position when a 16-alkyl group is present. An azido or formyl group may be present at the 6-position.

Examples of parent steroid 17α,21-dihydroxy-20-oxo compounds, the specified 21-esters of which may be used in accordance with this invention, include cortisone, hydrocortisone, dexamethasone, beclomethasone, betamethasone, prednisolone, prednisone, 16β-methyl-Δ⁶-prednisolone, 11-dehydrobetamethasone, 6α-bromo-betamethasone, 9α-fluoro-16-methylene-prednisolone and the like.

Ester groups at the 21-position which have been found to be capable of ready migration to the 17α-position in accordance with the invention include aliphatic carboxylate groups, e.g. alkanoyloxy groups preferably containing 1 to 6 carbon atoms which may, if desired, be substituted by one or more halogen atoms, e.g. chlorine atoms, or by a morpholino group, examples of such aliphatic carboxylate groups including the formate, acetate, propionate, n-butyrate, isobutyrate, tert-butylacetate, valerate, pivalate, morpholinoacetate and trichloroacetate groups; cyclo-aliphatic carboxylate groups, e.g. cycloalkyl-alkanoate or cycloalkanoate groups preferably containing 4 to 12 carbon atoms, e.g. a cyclohexylcarboxylate or adamantoate group; araliphatic carboxylate groups e.g. aralkanoate groups, preferably containing 1 to 6 carbon atoms in the aliphatic moiety, the aromatic moiety preferably comprising a monocyclic ring; aromatic carboxylate groups preferably monocyclic groups such as benzoates, and substituted benzoates containing, for example, one or more halogen (e.g. chlorine or fluorine), alkanoyloxy (e.g. acetoxy), alkoxy (e.g. methoxy), nitro, hydroxy or trifluoromethyl substituents, p-monosubstituted benzoates being generally preferred, neutral carbonate groups such as alkyl (e.g. $C_{1-6}$, preferably ethyl) carbonates; and neutral phosphate groups, e.g. dialkylphosphate groups, such as a dimethyl phosphate group.

In the Examples given hereafter, the following compounds are new and constitute further features of the present invention:

betamethasone 17-adamantoate
   betamethasone 17-pivalate
   betamethasone 17-cyclohexylcarboxylate
   betamethasone 17-ethylcarbonate
   betamethasone 17-morpholinacetate and
   betamethasone 17-tert-butylacetate The following examples illustrate the present invention; reactions were followed by thin-layer chromatography (t.l.c), using silica plates, developing with 4:1 chloroform-acetone, rotations were measured in dioxan at circa 1%w/v concentration and u.v. spectra were determined in ethanol, unless otherwise stated. Infrared (i.r.) spectra were recorded in bromoform and as nujol mulls and proton magnetic resonance (p.m.r.) spectra were recorded in deuterated dimethylsulphoxide. 'Petrol' refers to petroleum ether (bp. 60°–80°).

Melting points were recorded on a Kofler block, and are uncorrected unless otherwise stated.

Tetrahydrofuran (T.H.F.) was purified by passage through netural alumina, refluxing for 12 hours with sodium, and distillation from sodium. It was stored over sodium, and passed through Grade I netural alumina immediately before use.

Organic solutions were dried with magnesium sulphate.

Preparative layer chromatography (P.L.C.) was performed on silica (ca. 2 nn thickness), and compounds were eluted by washing 2–3 times with ethyl acetate. unless stated otherwise.

All reactions involving lithium dimethyl cuprate were performed in an atmosphere of dry nitrogen.

PREPARATION 1

Bromination of betamethasone 21-acetate

Bromine (0.225) in AR dioxan (40 ml.) was added to a solution of betamethasone 21-acetate (1.75 g.) in AR dioxan (40 ml.) cooled in ice. The mixture was allowed to warm to room temperature, stirred for two hours, then poured into aqueous sodium bicarbonate (500 ml.) and after stirring for 10 minutes was extracted with ether. The extracts were washed with aqueous sodium thiosulphate (1x), water (1x), dried and the solvent was removed. The product was dissolved in the minimum of chloroform, and precipitated with petrol to give 6β-bromobetamethasone 21acetate (70% purity, 2.15 g.) $\lambda_{max}$. 242 εm(e = 14,000).

A similar reaction was stirred overnight at room temperature. Work-up as above gave 6α-bromobetamethasone 21-acetate of 90% purity containing ca. 10% of starting material, and no 6β-bromo compound $\beta_{max}$. 238 λm (ε= 13,500).

PREPARATION 2

N,N,N', N'-tetramethylethylenediammonium tetrachlorocuprate (II)

Cupric chloride dihydrate (3.4 g., 20 mM) was dissolved in A.R. methanol (50 ml.) and N,N,N', N'-tetramethylethylenediamine (T.M.E.D.A., 2.32 g., 20mM) was added slowly with stirring. Concentrated hydrochloric acid was added to the mixture until the colour changed from blue to yellow. Ether (50 ml.) was added, and the product was filtered, washed with ether (3x), acetone (1x) and dried to give the title complex (5.97 g.) which was further purified by trituration with boiling methanol. A sample was recrystallised from methanol (Found C, 22.3; H, 5.6; N, 9.05. $C_6H_{18}N_2CuCl_4$ requires C, 22.27; H, 5.61; N, 8.66%).

PREPARATION 3

Betamethasone 21-adamantane-1'-carboxylate

A solution of betamethasone (1g) in dry tetrahydrofuran (40 ml) was treated with adamantane carbonyl chloride (about 2.2 equivalents) in dry tetrahydrofuran (5ml) and then pyridine (0.8 ml) was added. The mixture was refluxed for 6 hours and then most of the solvent was boiled off and the residue extracted with chloroform to afford a froth. The ether soluble portion of this froth was dissolved in chloroform and extracted repeatedly with dilute sodium bicarbonate solution. Evaporation of the chloroform layer gave a froth which was further purified by chromatography and crystallisation from chloroform-petroleum ether to yield the title compound m.p. 256°–259° decomp., $[\alpha]_D$ + 115.8° (c 1.0), $\lambda_{max}$. 238 nm (ε15,600).

PREPARATION 4

21-Esters of 17,21-dihydroxypregnane deriviatives General procedure.

The 21-alcohol (ca. 2 mM) and treated with the acid anhydride (1.0 ml.). The mixture was stored at room temperature overnight, poured into 2N sulphuric acid (150 ml.) and extracted with ethyl acetate. The extracts were washed with water, dried, and the solvent was removed. Using this method the 21-esters shown in the Table I were prepared.

TABLE I

| Parent Alcohol | Ester prepared | Yield of pure ester % | $[\alpha]_D^\circ$ (concentration) | M.pt. °C | Recrystallisation solvent | $\lambda_{max}$ n.m. | ε |
| --- | --- | --- | --- | --- | --- | --- | --- |
| Dexamethasone | 21-valerate | 72.5 | | | MeOH | 237.5 | 14,950 |
| 9α-chloro-16β-methyl prednisolone | 21-valerate | 96 | +127.8 (0.36) | 117–124 | MeOH | 237.5 | 15,300 |
| Hydrocortisone | 21-isobutyrate | 81.5 | +168 (0.58) | 185–187* | MeOH | 241 | 15,800 |
| 17,21-dihydroxy-16β-methylpregna-1,4,9 (11)-triene-3,20-dione | 21-propionate | | +79.5 (0.44) | 212–214 | MeOH | 238.5 | 15,600 |

*Preliminary melting and effervescence at 136°

PREPARATION 5

21-Acetoxy-11β, 17-dihydroxy-16β-methylpregna-1,4,8(9)-triene-3,20-dione

21-Acetoxy-9α-bromo-11β, 17-dihydroxy-16β-methylpregna-1,4-diene-3,20-dione (freshly dried to constant weight over phosphorus pentoxide, 2.0 g) finely divided calcium carbonate (4.0 g.) and dimethylacetamide (100 ml.) were vigorously stirred and refluxed under nitrogen for 25 minutes. The mixture was cooled, solid material was removed by filtration and the filtrate was concentrated to ca. 20 m. under reduced pressure, then treated with water. The product was extracted with ethyl acetate; the extracts were washed with sodium carbonate solution, then with water until neutral, dried (sodium sulphate) and evaporated in vacuo. The residue (1.525 g, 90%) was dissolved in chloroform and filtered through neutral alumina; the major portion of the filtrate gave a slightly yellow product (1.2 g., 72%) which was recrystallised from chloroform-petrol to give the title compound (700 mg., 42%), m.p. 206°–207°, $[\alpha]_D + 88°$, $\lambda_{max.}$ 239 nm ($\epsilon$ 15,500).

PREPARATION 6

11β,17,21-Trihydroxy-16β-methylpregna-1,4,8(9)-triene-3,20-dione

A stirred solution of 21-acetoxy-11β,17-dihydroxy-16β-methylpregna-1,4,8(9)-trieate-3,20-dione (1.25 g.), in dioxan (15 ml.) and methanol (15 ml.) was treated dropwise with a solution of potassium carbonate (414 mg.) in water (1.0 ml.); the stirring was continued under nitrogen for 1 hour. Glacial acetic acid (0.6 ml.) was added and the mixture was concentrated in vacuo to small volume, poured into water and extracted with ethyl acetate. Evaporation of the extracts gave a residue (740 mg.) which was redissolved in ethyl acetate and filtered through a plug of magnesium silicate; the filtrate was evaporated and the residue (600 mg.) was recrystallised from acetone-hexane to give the title compound (400 mg., 35%) m.p. 185°–187° $[\alpha]_D + 54°$, $\lambda_{max.}$ 239 nm ($\epsilon$ 15,800).

PREPARATION 7

21-Butyryloxy-11β, 17-dihydroxy-16β-methylpregna-1,4,8 (9)-triene-3,20-dione

A solution of 11β,17,21-trihydroxy-16β-methylpregna-1,4,8(9)-triene-3,20-dione (triol) (1.5G., 4.02 mmole) in dry pyridine (30 ml.) was stirred with n-butyric anhydride (3.01 ml.) at room temperature for 5 hours. The mixture was poured into N-sulphuric acid (500 ml.) and the precipitated product was triturated and cooled in ice to give a yellow solid (1.64 g.). Crystallisation from methanol gave the title compound (527 mg.). Mother liquor material was chromatographed (PLC in chloroform) to give a cream crystalline solid (493 mg.); two recrystallisations of a portion (87 mg.) from acetone gave the title compound as colourless crystals (52 mg.), m.p. 168°–171°, $[\alpha]_D + 81.4°$ (c 0.50), $\lambda_{max.}$ 239.5 nm. ($\epsilon$ 16,350).

PREPARATION 8

11β,17-dihydroxy-16β-methyl-21-propionyloxypregna-1,4,8 (9)-triene-3,20-dione

Using the same method described above in Preparation 7 the triol (985 mg.) was reacted with propionic anhydride (2 ml.) in dry pyridine (20 ml.) and gave, after work-up with N-hydrochloric acid, crude 21-propionate (1.02 g.). PLC (in chloroform-acetone (40:1)) gave 620 mg. (55%) of homogeneous product. Chromatography on silica followed by three recrystallisations from methanol gave the title compound as a very pale cream crystalline solid, m.p. 183°–195° (decomp.), $[\alpha]_D + 85.9°$ (c 0.97), $\lambda_{max.}$ 239.5 nm ($\epsilon$ 15,600).

PREPARATION 9

21-Acetoxy-11β,17-dihydroxy-16β-methylpregna-1,4,8, (9)-triene-3,20-dione

The triol (1.5 g., 4.02 mmole) was treated in dry pyridine (10 ml.) with acetic anhydride (5 ml.) at room temperature for 1 hour. The mixture was poured into sodium bicarbonate solution (100 ml.), stirred for 10 minutes and the product was extracted with ether. The extracts were washed with 2N sulphuric acid and then with water, dried and evaporated to give the title compound homogeneous on TLC on silica (chloroform-acetone (4:1)).

PREPARATION 10

11β,17-Dihydroxy-16β-methyl-21-valeryloxypregna-1,4,8 (9)-triene-3,20-dione

The triol (1.5 g., 4.02 mmole) was treated by the same method as described in Preparation 9, with valeric anhydride (5 ml.) in dry pyridine (10 ml.). The crude product was stirred in acetone with 2N hydrochloric acid (100 ml.) for 30 minutes before being re-extracted with ethyl acetate, the extracts washed with sodium bicarbonate solution, water, and dried and evaporated. Crystallisation from acetone-petrol gave the 21-valerate (1.3 g.). Mother liquor material was recrystallised three times from acetone-petrol to give the title compound (134 mg.) m.p. 167°–175°, $[\alpha]_D + 70.3°$ (c 0.97, chloroform), $\lambda_{max.}$ 239.5 ($\epsilon$ 16,700).

PREPARATION 11

21-Benzoyloxy-11β,17-dihydroxy-16β-methylpregna-1,4,8(9)-triene-3,20-dione

The triol (1.0 g., 2.69 mmole) in dry pyridine (9 ml.) was treated with benzoyl chloride (2.0 ml.) for 30 minutes at room temperature. Water was added and the product was extracted with ethyl acetate, extracts were washed with saturated sodium bicarbonate, and water (3x), dried and evaporated in vacuo. The product was crystallised from methanol to give yellow crystals (535 mg.) of crude 21-benzoate. A second crop (182 mg.) was combined with a portion (35 mg.) of the first crop and chromatographed (PLC) to give a yellow crystalline solid (116 mg.) which was recrystallised twice from methanol to give the title compound as colourless crystals (74 mg.), m.p. 221°–223° (decomp.), $[\alpha]_D + 113°$ (c 1.02, dimethylsulphoxide), $\lambda_{max.}$ 232.5 nm ($\epsilon$ 28,000).

PREPARATION 12

21 Esters of bethamethasone

Method A

Bethamethasone in pyridine was treated at 0° or room temperature with the appropriate acid chloride (1.2 – 4 equivs). When all the alcohol had reacted (t.l.c.) the mixture was diluted with water, and extracted with ethyl acetate. The extracts were washed with water, dried and the solvent was removed.

Method B

9α-Fluoro-11β,17α-dinydroxy-21-iodo-16β-methylpregna-1,4-diene-3,20-dione in acetone was refluxed with triethylamine (usually 4 equivalents) and the appropriate acid (usually 5 equivalents) until the reaction was judged complete (t.l.c.) (usually about 4 hours). After evaporation of the solvent water was added and the steroid extracted as in method A. It was sometimes necessary to remove a little colour by filtration through magnesium silicate. By these methods the 21-esters shown in Table II were prepared.

total of 12 equivalents of chloroacetic anhydride (12.84 g) in T.H.F. (86 mls) were refluxed until T.L.C. indicated complete reaction. The reaction mixture was poured into water (1 litre) containing 2N hydrochloric acid (100 ml.) and the product was collected and dried to give an off-white solid (2.94 g., 98%), A portion (300 mg.) was recrystallized twice from ethyl acetate-petrol to give the title 21-chloroacetate as colourless

TABLE II

| Betamethasone 21 ester | Method of preparation | Crystallisation solvent | m.p. (capillary) | $[\alpha]_D$ | $\lambda_{max}$ nm | $\epsilon$ |
|---|---|---|---|---|---|---|
| Isobutyrate | B | Acetone/Petrol | 232–3° | +135.5° | 239 | 15,400 |
| Valerate | A | Acetone/Petrol | 217–8° | +116.1° | 238 | 16,300 |
| Pivalate | B | Methanol/Water | 215–7° then 276–8° decomp. | +113.2° | 238–9 | 16,200 |
| t-Butylacetate | B | Methanol/Water | 200–1° | +115.2° | 239 | 15,100 |
| Trichloroacetate | A(1) | Ether | 229–33° | +104.6° | 238 | 16,100 |
| Cyclohexylacetate | A | Ethanol/water | 216–26° | +110.9° | 239 | 15,800 |
| Benzoate | A | Acetone/Petrol | 248–53° | +159.5° | 233 | 27,000 |
| Ethyl carbonate | A(2) | Acetone/Water | 241–3° decomp. | +123.6° | 239 | 15,000 |

(1)Dioxan - ether as solvent containing a little pyridine.
(2)Using ethyl chloroformate in pyridine.

PREPARATION 13

11-Dehydrobetamethasone 21-acetate

Betamethasone 21-acetate (750 mg.) in acetic acid (20 ml.) was treated with chromium trioxide (172 mg.) in acetic acid (40 ml.) at room temperature. After 1 hr. more (100 mg.) chromium trioxide was added and the mixture stood overnight at room temperature. Alcohol was added to destroy excess reagent and after evaporation the residue was extracted with chloroform, washed with water and again evaporated. After treatment with charcoal in boiling ethyl acetate the product was filtered through magnesium silicate in chloroformbenzene (1:1) and then crystallised from ethyl acetate to give title compound m.p. 253°–257° (capillary), $\lambda_{max}$. 236 nm ($\epsilon$ 15,720).

PREPARATION 14

11-Dehydrohetamethasone 21-valerate

Betamethasone 21-valerate in pyridine was treated with the chromium trioxide-pyridine reagent essentially as described by Poos et al., J.A.C.S., 1953, 75, 422. Crystallisation from ether/petrol gave title compound m.p. 177°–179° (capillary), $\lambda_{max}$. 236–6 nm ($\epsilon$ 15

PREPARATION 15

Betamethasone 21-dimethyl phosphate

A stirred solution of betamethasone (500 mg) in dry pyridine (7.5 ml.) was cooled to −20° treated with dimethyl phosphorochloridate (550 mg, 3 mol) and kept at that temperature for 2½ hr. The solvent was removed in vacuo and the residue partitioned between ethyl acetate and water. The dried organic phase was taken to dryness in vacuo and the resulting froth (564 mg) was crystallised from acetone giving title compound in two crops (244 & 140 mg.) m.p. 202°–203°&195°–197° Recrystallisation of the first crop from acetone gave material m.p. 194°–195°.

PREPARATION 16

21-Chloroacetoxy-9α-fluoro -11β,17-dihydroxy-16β-methylpregna-1,4-diene-3,20-dione Betamethasone (2.5 g.), pyridine (2.16 ml.) and a crystals (210 mg.), m.p. 253°–255°, $[\alpha]_D$ + 118°, (c 1.0) $\lambda_{max}$. 237 nm ($\epsilon$ 15,000).

PREPARATION 17

9α-Fluoro-11β,17-dihydroxy-21-iodoacetoxy-16β-methylpregna-1,4,-diene-3,20-dione Betamethasone 21-chloroacetate (2.64 g.), and dry sodium iodide (2.81 g.) were refluxed in acetone (135 ml.) for 3 hours. The reaction mixture was poured into water (400 ml.) to give a colourless solid (2.87 g., 91%). A portion (200 mg.) was recrystallized first from ethyl acetate-petrol then acetone-petrol to give the title iodoacetate as colourless crystals (147 mg.), double m.p. 145°–147°, 175°–179° dec., $[\alpha]_D$ + 96° (c 1.0) $\lambda_{max}$. 237 nm ($\epsilon$ 16,800).

PREPARATION 18

9α-Fluoro-11β,17-dihydroxy-16β-methyl-21-morphloinacetoxypregna-1,4-diene-3,20-dione Betamethasone 21-iodoacetate (2.67 g) and morpholine (2.08 ml redistilled) were refluxed in acetone (131 ml) for 45 minutes. Volatile material was removed under reduced pressure and the residue was dissolved in chloroform, washed with water, dried and evaporated to a brown-yellow foam which crystallized from ethyl acetate-petrol to give the title aminoester as pale yellow crystals (2.215 g., 90%). An analytical sample was obtained from methanol as colourless crystals, m.p. 234°–236°, $[\alpha]_D$ + 112° (c 1.0), $\lambda_{max}$. 237–238 nm ($\epsilon$ 16,800).

PREPARATION 19

9α-Fluoro-16-methylene prednisolone 17α,21-methylorthovalerate

9α-Fluoro-16-methylene prednisolone (0.5 g) in dioxan (25 ml) was treated with methylorthovalerate (1 ml) and p-toulenesulphonic acid (25 mg.). The mixture was shaken at room temperature for 20 mins and poured into 2% aqueous sodium bicarbonate containing 3 drops of pyridine. The steroid was extracted with ethyl acetate/hexane to yield title compound (0.41 g.) m.p. 146°–55° (corrected), $[\alpha]_D + 23°$ (c 1.0, chloroform), $\lambda_{max}$. 238 nm ($\epsilon$ 16,200).

PREPARATION 20

9α-Fluoro-16-methylene prednisolone 21-valerate

9α-Fluoro-16-methylene prednisolone 17α,21-methylorthovalerate (0.47 g) was left overnight with a mixture of acetic acid (9 ml) and water (1 ml). The mixture was poured into water and the steroid was filtered off and recrystallised from methanol to yield title compound (0.24 g), m.p. 242°–3° (corrected), $\lambda_{max}$. 238 nm, $[\alpha]_D + 20.4°$ (c 1.0).

EXAMPLE 1

17-Acetoxy-6α-bromo-9α-fluoro-11β,21-dihydroxy-16β-methylpregna-1,4-diene-3,20-dione Methyl lithium (3.0 ml of a 1.75 M solution in ether, 10.5 equiv.) was added to a suspension of cuprous iodide (0.5 g., 5.9 equiv.) in dry T.H.F. (10 ml.) at 0 °. The mixture was stirred at 0° for 15 minutes, to give a clear solution of lithium dimethylcuprate which was cooled to −25°, and treated with a solution of 6α-bromobetamethasone 21-acetate (256 mg., 0.5 mM) in dry T.H.F. (5 ml.). The mixture was stirred at −25° to −30° for 30 minutes, when t.l.c. showed no starting material. N,N,N',N'-tetramethylethylene diammonium tetrachlorocuprate (II) (0.8 g.), was added and the mixture warmed to room temperature and stirred for one hour. Aqueous ammonium chloride (ca. 50 ml.) was added, and after being stirred for 15 minutes the mixture was extracted with ethyl acetate. The extracts were washed with dilute sulphuric acid (1x), water (1x), dried and the solvent was removed to yield the title compound as a crude product.

For characterisation, the total crude product was dissolved in dry pyridine (3 ml.) and acetic anhydride (2 ml.) and stored at room temperature for 4 hours. The mixture was poured into aqueous sodium bicarbonate, stirred for 15 minutes, and extracted with ethyl acetate. The extracts were washed with dilute sulphuric acid, water, dried and the solvent was removed. T.l.c. showed one major product, which was purified by P.L.C. plates (developing with 6:1 $CHCl_3$ — acetone). The product (71 mg., 25%) was recrystallised twice from methanol to give 17,21-diacetoxy-6α-bromo-9α-fluoro-11β-hydroxy-16β-methylpregna-1,4-diene-3,20-dione, p.m.r. values include $\tau$ 7.87 and 7.91 (3H, 17 and 21 acetate methyls), 5.25 and 5.51 (A B quartet J=17 Hz 21 $CH_2$).

EXAMPLE 2

The reaction of betamethasone 21-esters with lithium dimethyl cuprate

The lithium dimethylcuprate reagent was prepared as in Example 1 and after cooling to −30° was treated with a solution of the 21-ester (1mM) in dry T.H.F. (10 ml.). The mixture was kept at −25° to −30° until t.l.c. showed complete reaction (usually after 15–30 minutes). At this stage one of two work-up modes was employed.

Method A

N,N,N',N'-tetramethylethylenediammonium tetrachlorocuprate-(II)(1.6 g.) was added to the reaction mixture, which after warming to room temperature was stirred for 30 minutes. The mixture was poured into aqueous ammonium chloride (100 ml.), stirred for 15 minutes, and filtered (Kieselghur). The filtrate was extracted with ethyl acetate, and the extracts were washed with water, dried and the solvent was removed. The products were crystallised from acetone-petrol.

Method B

The reaction mixture was poured into aqueous ammonium chloride (100 ml.) and stirred for 15 minutes and filtered. Extraction as above gave the product, which was crystallised.

In this way the 17-esters shown in Table III were prepared. All rotations were determined in chloroform, except that on the 17-pivalate (see below).

TABLE III

| 21-ester | Product | Yield of pure isolated product % | Yield (approx.) from tlc % | Equivs. of $LiMe_2Cu$ used | Reaction temp. °C | Reaction time | Work up mode. | M.pt °C | $[\alpha]_D^°$ (concentration) | $\alpha_{max}$ n.m. | $\epsilon$ |
|---|---|---|---|---|---|---|---|---|---|---|---|
| Acetate[1] | 17,21-diacetate | 56 | | 5 | −25 to −30 | 30 min | A | | | | |
| | | 43 | | 5 | " | 30 min | B | | | | |
| Valerate | 17-valerate | 73 | 90 | 5 | " | 15 min | A | | +76.6 | | |
| | | 75.7 | | 1.5 | " | 15 min | B | | (0.99) | 237.5 | 15,500 |
| Isobutyrate | 17-isobutyrate 2 | 80 | 90 | 5 | " | 15 min | A | | | | |
| t-butyl acetate | 17-t-butyl acetate | 33 | 80 | 2.5 | " | 30 min | B | 225–231 (dec.) | +76.7 (1.06) | 238 | 15,800 |
| Cyclohexyl carboxylate | 17-cyclohexyl carboxylate | 39 | 90 | 2.5 | " | 10 min | B | 193–197 | +72.5 (1.05) | 237.5 | 15,300 |
| Benzoate | 17-benzoate[2] | 66 | | 5 | " | 15 min | A | | | 232.5 | 27,400 |
| Ethyl carbonate | 17-ethyl carbonate | 34 | 70 | 5 | −25 to −30 | 1 hour | A | 140–144 | +85.6 (1.15) | 237.5 | 15,300 |
| | | 44 | | 3 | " | 1 hour | A | | | | |
| Morpholinoacetate | 17-morpholinoacetate | | 50 | 2.5 | " | 30 min | B | 185–188 | +65 (0.99) | 237 | 15,500 |
| | | 42 | 90 | 2.5 | " | 30 min | A | | | | |
| | | | | | −25 to −30 + room | 2 hour + | | 263–270 | +76.7 | | |

TABLE III — Continued

| 21-ester | Product | Yield of pure isolated product % | Yield (approx.) from tlc % | Equivs. of LiMe$_2$Cu used | Reaction temp. °C | Reaction time | Work up mode. | M.pt °C | $[\alpha]_D°$ (concentration) | $\alpha_{max}$ n.m. | $\epsilon$ |
|---|---|---|---|---|---|---|---|---|---|---|---|
| Pivalate | 17-pivalate[3] | 28 | | 5 | temp. −10 to | 30 min | B | (dec.) | (0.91) +68.0 | 237.5 | 15,300 |
| Adamantoate | 17-adamantoate | 41.5 | | 2.5 | −15 | 2 hour | B | | (0.81) | 237.5 | 15,600 |

[1]The 17-ester product from the reaction was acetylated with acetic anhydride in pyridine, and the 17,21-diacetate was isolated by preparative layer chromatography, crystallised from methanol, and shown to be identical to authentic material by t.l.c., i.r. and p.m.r.
[2]Identical with authentic material by t.l.c., and spectral means.
[3]Rotation measured in 80% CHCl$_3$— DMSO.

EXAMPLE 3

Reaction of betamethasone 21-valerate with various bases a. Methyl lithium

Betamethasone 21-valerate (832 mg., 1.75 mM) was dissolved in dry T.H.F. (20 ml.) under dry nitrogen at room temperature, and methyl lithium (1 ml. of a ca. 2M solution in ether, 1.15 equiv.) was added. When t.l.c. indicated complete reaction the mixture was poured into an excess of 2N sulphuric acid, and extracted with ethyl acetate. The extracts were washed with water, dried, and the solvent was removed to give a non-crystalline foam. P.L.C. (developing twice with 10:1 chloroform-acetone) gave pure betamethasone 17-valerate (356 mg., 43%) which was crystallised from acetone-petrol to give offwhite crystals (289 mg.), resembling authentic 17-valerate on t.l.c.

b. Butyl lithium

Betamethasone 21-valerate (832 mg.), was dissolved in dry T.H.F. (20 ml.) under nitrogen, and the solution was cooled to −35°, n-butyl lithium (1 ml. of a ca. 2 M solution, 1.15 equiv.) was added, and after 1 minute t.l.c. showed only partial reaction, and more butyl lithium (0.5 ml. of a ca. 2M solution) was added. T.l.c. after 1 minute showed nearly complete reaction, and the product was isolated by the method of (a). P.L.C. as in (a) gave betamethasone 17-valerate (348 mg., 42%) which was crystallised from acetone-petrol to give offwhite crystals (253 mg.), with i.r. spectra resembling those of authentic material.

c. Potassium t-butoxide

Potassium t-butoxide (dried under vacuum at 120°, 123 mg., 1.1 mM) was dissolved in dry T.H.F. (5 ml.) under a stream of nitrogen, at room temperature. Betamethasone 21-valerate (416 mg., 0.875 mM) dissolved in dry T.H.F. (5 ml.) was added, and after 30 minutes the reaction was worked-up by the method of (a). The major product was isolated by P.L.C. as in (a) to give 9α-fluoro-11β,20-dihydroxy-16β-methyl-3-oxopregna-1,4, 17(20)-triene-21-al (isomer B, 94 mg., 33%) which was recrystallised twice from methanol to give white crystals (37 mg.), m.pt. 213°–218° (mostly, last traces up to 227°), $[\alpha]_D + 119°$ (c, 0.795) $\lambda_{max}$ 239 nm ($\epsilon$ 15,550) and 273 nm ($\epsilon$ 14,050).

d. Sodium bis(trimethylsilyl)amide

Sodium bis(trimethylsilyl)amide (201 mg., 1.1 mM) was dissolved in dry T.H.F. (5 ml.) and cooled to −40° under a stream of nitrogen. Betamethasone 21-valerate (476 mg., 1 mM) dissolved in dry T.H.F. (5 ml.) was added, and the mixture was stirred at ca. −40° for 30 minutes, when a further 1.1 equiv. of the sodium amide were added. After ca. 30 minutes the mixture was warmed to room temperature, stirred for 30 minutes, and then worked up by the method of (a). The product precipitated from methanol, and was triturated with boiling methanol and collected to give 9α-fluoro-11β, 20-dihydroxy-16β-methyl-3-oxopregna-1,4,17(20)-triene-21-al (Isomer A, 34 mg., 9%) as a white powder, $\lambda_{max}$ 240 nm ($\epsilon$ 15,500), 275 nm ($\epsilon$ 12,500).

A reaction preformed at −35° to −40° for ca. 1 hour using 2.2 equivalents of base and worked-up as above gave a mixture from which betamethasone 17-valerate (276 mg., 58%) was isolated by chromatography. Crystallisation from acetone-petrol gave off-white crystals with i.r. spectra resembling those of authentic material.

e. Lithium bis(trimethylsilyl)amide

Betamethasone 21-valerate (0.476 g.), was dissolved in dry T.H.F. (10 ml.) under a stream of nitrogen, and the solution was cooled to −40°. Lithium bis(trimethylsilyl)amide etherate (0.610 g., 2.5 equiv.) was added in three portions (265 mg., 265 mg., and 80 mg.) over a period of 1 hour at −35° to −40°. The reaction product was isolated as above, and crystallised from acetonepetrol to give betamethasone 17-valerate (374 mg., 77%) with i.r. spectra resembling those of authentic material. The product contained traces of 21-valerate and betamethasone.

f. Sodium hydride

Sodium hydride (44 mg. of a 60% dispersion in oil, 1.1 equiv.) was suspended in dry T.H.F. (3 ml.) and betamethasone 21-valerate (476 mg), in dry T.H.F. (5 ml.) was added. The mixture was stirred at room temperature until effervescence ceased, and then a further batch of sodium hydride (1.1 equiv.) was added, and stirring was continued until effervescence ceased. T.l.c. showed that 9α-fluoro-11β,20-dihydroxy-16β-methyl-3-oxopregna-1,4,17(20)-triene-21-al had been formed.

g. Lithium diethylamide

Diethylamine (distilled from KOH pellets, 584 mg., 8.mM, 8 equiv.) was dissolved in dry T.H.F. (10 ml.), under nitrogen, and the solution was cooled to −15°. Butyl lithium (2 ml. of a 2.1M solution, 4.2 equiv.) was added, and the mixture was stirred for 15 minutes at −15° to −20°. Betamethasone 21-valerate (476 mg), was added and the mixture was stirred for 2 hours at −15° to −20°, and the product was isolated by the method of (a). P.L.C. (developing twice with 9:1 chloroform/acetone) gave betamethasone 17-valerate (175 mg., 37%). which was crystallised from acetone-petrol to give off-white crystals (99 mg) with i.r. spectra resembling those of authentic material.

h. Lithium isopropylcyclohexylamide

N-isopropylcyclohexylamine (distilled from KOH pellets, 423 mg., 3 mM) was dissolved in dry T.H.F. (10 ml.) under nitrogen, and the solution was cooled to 0°. Butyl lithium (1 ml. of a 2.1 M solution, 2.1 equiv.) was added, and the mixture was stirred at 0° for 10 minutes and then cooled to −30°. Betamethasone 21-valerate (0.476 g), dissolved in dry T.H.F. (10 ml.) was added, and the mixture was stirred at −25 to −30° for 30 minutes, and then poured into 2N sulphuric acid (100 ml.) and stirred for 5 minutes. Ethyl acetate extraction gave the product which was crystallised from acetone-petrol extraction gave the product, which in most cases was purified by crystallisation. In this way the 17-esters shown in Table IV were prepared.

TABLE IV

| Parent 21-ester | Ester prepared | Yield of pure ester % | Yield Estimated from t.l.c. % | $[\alpha]_D°$ (concentration) | M.pt. °C | Recrystall. solvent | U.V. spectrum $\lambda_{max}$. n.m. | $\epsilon$ |
|---|---|---|---|---|---|---|---|---|
| Dexamethasone 21-valerate | 17-valerate | 82 | ca 90 | | | Acetone-petrol | 238 | 16,100 |
| 9α-chloro-16β-methyl prednisolone 21-valerate | 17-valerate | 52 | ca 90 | | | MeOH | 237.5 | 15,400 |
| Hydrocortisone 21-isobutyrate | 17-isobutyrate | 25 | ca 90 | +50.8 (1.12) | 188–190 | Acetone-petrol | 240.5 | 16,300 |
| 17,21-dihydroxy-16β-methylpregna-1,4,9,(11)-triene-3,20-dione 21-propionate | 17-propionate | 31 | ca 70 | +24.2 (0.55) | 177–181 | MeOH | 237.5 | 17,150 |
| Prednisolone 21-acetate | 17-acetate | 13 | ca 70 | +11.9 (0.69) | 223–227* | MeOH | 242 | 14,650 |

*preliminary melting at 216°.

to give betamethasone 17-valerate as off-white crystals (350 mg., 73%), with i.r. spectra resembling those of authentic material.

i. Lithium dicyclohexylamide

Betamethasone 21-valerate (0.952 g., 2 mM) in dry T.H.F. (20 ml.) was reacted with lithium dicyclohexylamide prepared by the method h) from dicyclohexylamine (1.634 g., 8 mM) and butyl lithium (3 ml. of a 2.1M solution, 6.6 mM) in dry T.H.F. (20 ml.) at −50°. The product was isolated by the method of h), and crystallised from acetone-petrol to give betamethasone 17-valerate as off-white crystals (0.680 g., 71%) containing traces of 21-valerate and betamethasone. Recrystallisation from acetone-petrol gave purer material (0.332 g.), with i.r. spectra resembling those of authentic material.

j. Lithium di-isopropylamide

Betamethasone 21-valerate (0.952 g., 2mM) in dry T.H.F. (15 ml) was reacted with lithium di-isopropylamide, prepared by the method of (h) from di-isopropylamine (0.85 ml., 0.607 g., 6 mM) and butyl lithium (2 ml. of a ca. 2M solution, 4 mM, 2 equiv.) in dry T.H.F. (10 ml.) at −50°. After 1 hour the product was isolated by the method of (h), and shown by t.l.c. to contain betamethasone 17-valerate.

EXAMPLE 4

Reaction of 21-Esters of 17,21-dihydroxypregnane derivatives with lithium dimethyl cuprate General procedure Cuprous iodide (0.5 g., 2.6 mM) was suspended in dry T.H.F. (10 ml.) under nitrogen, and cooled to 0°. Methyl lithium (2 ml. of a ca. 2.5 M solution, 5 mM) was added, and the mixture was stirred at 0° for 15 minutes, to give a solution of lithium dimethyl cuprate, which was cooled to −30°. The 21-ester (ca. 1 mM), dissolved in dry T.H.F. (10 ml.) was added, and the reaction mixture was stirred at −30° to −25° until t.l.c. indicated that the reaction had stopped, (usually less than 30 minutes). N,N,N′,N′-tetramethylethylenediammonium tetrachlorocuprate-(II) (1.6 g.) was added, and the mixture was stirred at room temperature for 15–30 minutes and poured into saturated aqueous ammonium chloride (ca. 100 ml.). Ethyl acetate extraction gave the product, which in most cases was purified by crystallisation. In this way the 17-esters shown in Table IV were prepared.

EXAMPLE 5

Betamethasone 17-dimethylphosphate

Betamethasone 21-dimethylphosphate (0.5 g., 1 mM) was treated with lithium dimethylcuprate by the general procedure given in Example 4. The treatment with N,N,N′,N′-tetramethylethylene-diammonium tetrachlorocuprate-(II) was omitted, and the product was crystallised from methanol to give the 17-dimethyl phosphate as white crystals (38%), $\lambda_{max}$. 236 nm ($\epsilon$ 15,800).

EXAMPLE 6

Reaction of 9α-chloro-11β,17-dihydroxy-16β-methyl-21-valeryloxypregna-1,4-diene-3,20-dione with lithium bis(trimethylsilylamide).

Lithium bis(trimethylsilyl)amide etherate (723 mg., 3 mM, 3 equiv.) was added to a solution of 9α-chloro-16β-methyl prednisolone 21-valerate (493 mg., 1 mM) in dry T.H.F. at −40° under nitrogen. After ¾ hour a further portion of base (241 mg., 1 mM) was added, and after a total of 2 hours at −40° the reaction mixture was poured into 2N sulphuric acid (100 ml.) and extracted with ethyl acetate. The extracts were washed with water, dried, and the solvent was removed. P.L.C. (developing twice with 10:1 chloroform-acetone) gave two fractions. The more polar (209 mg.) was recrystallised twice from methanol to give 9α-chloro-11β,21-dihydroxy-16β-methyl-17-valeryloxypregna-1,4-diene-3,20-dione (129 mg., 26%) as white crystals, $\lambda_{max}$. 237.5 nm ($\epsilon$ 15,100).

The non-crystalline, less polar fraction (82.4 mg.) was rechromatographed to give 9β,11β-epoxy-21-hydroxy-16β-methyl-17-valeryloxypregna-1,4-diene-3,20-dione as a foam (49.5 mg., 11%), $\lambda_{max}$. 247 nm ($\epsilon$ 14,800).

EXAMPLE 7

The reaction of bentamethasone 17-valerate with potassium t-butoxide

Betamethasone 17-valerate (476 mg., 1 mM) was dissolved in dry T.H.F. (10 ml.) under a stream of nitrogen. Potassium t-butoxide (dried, 123 mg., 1.1 mM) was added, and the mixture was stirred for 2 hours at room temperature, and poured into 2N sulphuric acid. Ethyl acetate extraction, and chromatography (developing twice with 10:1 chloroform-acetone) gave 9α-fluoro-11β,20-dihydroxy-16β-methyl-3-oxo-pregna-1,4,17(20)-triene-21-al (isomer B, 144 mg., 38%) which was crystallised from methanol to give pure material with i.r. and n.m.r. spectra resembling those of the material of Example 3(c).

EXAMPLE 8

Reaction of betamethasone 21-trichloroacetate with lithium dimethylcuprate

Betamethasone 21-trichloroacetate (0.5 g., 0.93 mM) was reacted with lithium dimethylcuprate using the general procedure given in Example 4, and the reaction was terminated after 3½ hours at −30°. The product was chromatographed (thick silica plates, developed four times with 6:1 chloroform-acetone) to give two fractions.

The less polar fraction (260 mg.) was crystallised from methanol to give the mixture of betamethasone 17-2′,2′-dichloropropionate and betamethasone 17-2′-chloroisobutyrate (77 mg.), $\lambda_{max}$ 236.5 nm ($E_1^1$ = 316).

EXAMPLE 9

17-Butyryloxy-11β,21-dihydroxy-16β-methylpregna-1,4,8(9)-triene-3,20-dione

A suspension of dry cuprous iodide (1.0 g., 5.25 mmole, 2.5 mole eq.) in dry T.H.F. (21 ml.) was stirred at 0° under dry oxygen-free nitrogen and treated with a solution (1.95 M) of methyl lithium in ether (4.2 ml., 8.2 mmole MeLi, 3.9 mole eq.) to give after 10 minutes a solution of lithium dimethylcuprate (1.95 mole eq.). The mixture was then cooled to −30° and a solution of 21-butyryloxy-11β,17-dihydroxy-16β-methylpregna-1,4,8(9)-triene-3,20-dione (932 mg., 2.1 mmole) in dry T.H.F. (21 ml.) was added. The resulting mixture was stirred at −25° to −30° for 1 hour. After 43 minutes N,N,N′,N′-tetramethylethylene diammonium tetrachlorocuprate-(II)(1.68 g.) was added to the mixture and stirring was carried out for 30 minutes while the temperature was allowed to rise to room temperature and the colour changed from orange to green. The mixture was poured into aqueous ammonium chloride (40 ml.) and stirred for 15 minutes; solid material was removed by filtration after the addition of ethyl acetate. The product was extracted with ethyl acetate and the organic extracts were washed with sodium thiosulphate solution (1×), water (2 ×), dried and evaporated to a yellow foam (956 mg.). P.L.C. (chloroform × 8) gave a cream crystalline solid (708 mg., 76%). Recrystallisation from acetone gave the title compound as a colourless crystalline solid (543 mg.), $[\alpha]_D$ + 6.4° (c 1.05), $\lambda_{max}$ 238.5 nm ($\epsilon$ 16,250).

EXAMPLE 10

11β,21-Dihydroxy-16β-methyl-17-propionyloxypregna-1,4,8(9)-triene-3,20-dione

11β,17-Dihydroxy-21-propionyloxy-16β-methylpregna-1,4,8(9)-triene-3,20-dione (620 mg.) was rearranged under the same conditions described for the 21-butyrate-17-ol of Example 9 using lithium dimethylcuprate (1.95 mole eq.) in THF. PLC (chloroform × 6) gave the title compound (505 mg., 81.5%); crystallisation from acetone gave a pure sample as colourless crystals (253 mg.) $[\alpha]_D$ + 5.5° (c 0.96), $\lambda_{max}$ 239 nm ($\epsilon$ 15,450).

EXAMPLE 11

17-Acetoxy-11β,21-dihydroxy-16β-methylpregna-1,4,8(9)-triene-3,20-dione

21-Acetoxy-11β,17-dihydroxy-16β-methylpregna-1,4,8(9)-triene-3,20-dione (1.34 g.) was treated in T.H.F. with lithium dimethylcuprate (1.95 mole eq.) under conditions similar to those described in Example 9 to give a crude product (1.33 g.) which was recrystallised successively from acetone, chloroform and acetonechloroform to give the title compound (392 mg.) m.p. 204°–207°, $[\alpha]_D$ + 4.4° (c 0.94, chloroform), $\lambda_{max}$ 239 nm ($\epsilon$ 15,700).

EXAMPLE 12

11β,21-Dihydroxy-16β-methyl-17-valeryloxypregna-1,4,8(9)-triene-3,20-dione

11β,17-Dihydroxy-16β-methyl-21-valeryloxypregna-1,4,8(9)-triene-3,20-dione (1.14 g.) was treated in tetrahydrofuran with lithium dimethylcuprate (1.95 mole equiv.) under conditions similar to those used in Example 9 to give the crude product (1.18 g.) which afforded after four recrystallisation from acetone the title compound (376 mg.), m.p. 214°–218°, $[\alpha]_D$ 0.9° (c 1.07, chloroform), $\lambda_{max}$ 240 nm ($\epsilon$ 15,600).

EXAMPLE 13

17-Benzoyloxy-11β,21-dihydroxy-16β-methylpregna-1,4,8(9)-triene-3,20-dione

The procedure was as described in Example 9, 21-benzoyloxy-11β,17-dihydroxy-16β-methylpregna-1,4,8(9)-triene-3,20-dione (500 mg., 1.05 mmole) was added in T.H.F. (15 ml.) to a solution of lithium dimethylcuprate (1.86 mole eq.) prepared at 0° from methyl lithium in ether (2.0 ml. of 1.95 M. solution, 3.90 mmole) and cuprous iodide (500 mg., 2.62 mmole, 2.5 mole eq.) in T.H.F. (10 ml.). The crude product (473 mg.) was chromatographed (PLC chloroform-acetone (4:1)) to give a yellow foam (327 mg.) which was crystallised and recrystallised from acetone to give colourless needles of title compound, m.p. 213°–244° (decomp.), $[\alpha]_D$ − 60.5° (c 0.88, dimethylsulphoxide), $\lambda_{max}$ 233 nm ($\epsilon$ 28,800).

EXAMPLE 14

17-Acetoxy-9α-fluoro-11β,21-dihydroxy-16-methylene-pregna-1,4-diene-3,20-dione

21-Acetoxy-9α-fluoro-11β,21-dihydroxy-16-methylene-pregna-1,4-diene-3,20-dione (432 mg., 1 mM) was reacted with lithium dimethyl cuprate prepared as in Example 4 (2.5 equivalents) in dry T.H.F. at −35 to −25° for 1 hour. The mixture was poured into 2N sulphuric acid (100 ml.), stirred for 15 minutes, then filtered and extracted with ethyl acetate. The extracts were washed with water, dried and the solvent was removed. P.L.C. gave three fractions. The major fraction was crystallised from acetone-petrol to give the title 17-acetate, (129 mg.) $[\alpha]_D$ − 110° (c 1.27).

EXAMPLE 15

9α-Fluoro-11β,21-dihydroxy-16-methylene-17-valeryloxy-pregna-1,4-diene-3,20-dione 9α-Fluoro-11β,17-dihydroxy-16-methylene-21-valeryloxy-pregna-1,4-diene-3,20-dione (0.206 g., 0.435 mM) was reacted with lithium dimethyl cuprate prepared as in Example 4 (3 equivalents) in dry T.H.F. at −20° to −30° for 30 minutes. N,N,N',N'-tetramethylethylene-diammonium tetrachlorocuprate-(II) (0.8 g.) was added, and the mixture was stirred at room temperature for 1 hour, then poured into aqueous ammonium chloride (100 ml.), stirred for 15 minutes, filtered and extracted with ethyl acetate. The extracts were washed with water, with aqueous sodium thiosulphate, with water again, then dried and the solvent was removed. The residue was crystallised from acetone-petrol to give the title 17-valerate (0.162 g.), $[\alpha]_D - 92°$ (c 1.26), $\lambda_{max.}$ 237 nm ($\epsilon$ 15,500).

EXAMPLE 16

17-Acetoxy-9α-fluoro-21-hydroxy-16β-methylpregna-1,4-diene-3,11,20-trione

21-Acetoxy-9α-fluoro-17-hydroxy-16β-methylpregna-1,4-diene-3,11,20-trione (432 mg., 1 mM) was treated with lithium dimethylcuprate prepared as in Example 4 (2.5 equivalents) in dry T.H.F. at ca. −30°, for 2 hours, and then worked-up by the method of Example 15. The resultant foam (468 mg.) was crystallised from methanol to give white crystals (345.6 mg., 80%) $\lambda_{max.}$ 233.5 nm ($\epsilon$ 15,000), shown by p.m.r. spectroscopy to be an approximately 3:1 mixture of the title 17-acetate, and starting material.

EXAMPLE 17

9α-Fluoro-21-hydroxy-16β-methyl-17-valeryloxypregna-1,4-diene-3,11,20-trione

9α-Fluoro-17-hydroxy-16β-methyl-21-valeryloxy-pregna-1,4-diene-3,11,20-trione (474 mg., 1 mM) was reacted with lithium dimethylcuprate prepared as in Example 4 (2.5 equivalents) in dry tetrahydrofuran at −30° for 2 hours, and the mixture was worked-up by the method of Example 15, to give an off-white foam (506 mg.) which on crystallisation from acetone-petrol gave the title 17-valerate as white needles (216.6 mg.), $\lambda_{max.}$ 235 nm ($\epsilon$ 15,700).

EXAMPLE 18

9α-Fluoro-11β,21-dihydroxy-16β-methyl-17-valeryloxy-pregnae1,4-diene-3,20-dione

A. Using lithium trimethylmanganese

Manganous bromide (dried in vacuo at 100°, 0.44 g., 2.5 mM) was suspended in dry ether (10 ml.) under nitrogen, and cooled to 0°. Methyl lithium (3 mls. of a ca. 2.5 M solution in ether, ca. 7.5 mM) was added, and the mixture was stirred at 0° for 10 minutes, then cooled to −10°. Betamethasone 21-valerate (0.476 g., 1 mM) in dry T.H.F. (15 ml.) was added, and the mixture was stirred at −10° for 30 minutes, then poured into aqueous ammonium chloride, and extracted with ethyl acetate. The extracts were washed with aqueous sodium chloride, dried and the solvent was removed to yield a foam (443 mg.). P.L.C. gave the title 17-valerate as a foam (105 mg., 22%), which was crystallised from acetone-petrol to give yellowish crystals (65 mg.), $\lambda_{max.}$ 236.5 nm ($\epsilon$ 14,650), whose infrared and p.m.r. spectra resembled those of authentic material.

B. Using lithium trimethylcobalt

Cobaltous iodide (dried under vacuum at 100° 0.782 g., 2.5 mM) was treated with methyl lithium (7.5 mM) by the method of the previous experiment, at −10°. To the resultant solution was added betamethasone 21-valerate (0.476 g., 1 mM) in dry T.H.F. (15 ml.), and the mixture was stirred at −10° to −20° for 1.75 hours.

Work-up by the method of the previous Example gave a foam (0.466 g.), which on P.L.C. gave a foam (252 mg., 53%). Crystallisation from acetone-petrol gave off-white crystals (205 mg.), of the title 17-ester, $\lambda_{max.}$ 237 nm ($\epsilon$ 15,050), whose infrared and p.m.r. spectra resembled those of authentic material.

EXAMPLE 19

The reaction of betamethasone 21-valerate with lithium bis(trimethylsilyl)amide in dioxan Betamethasone 21-valerate (0.476 g, 1 mM) was dissolved in dry dioxan (5 mls, passed through grade I alumina) under nitrogen at room temperature. Lithium bis(trimethylsilyl) amide etherate (0.723 g, 3mM, 3 equ.) in dry dioxan (15 mls.) was added rapidly with stirring. After 30 minutes another batch of lithium bis(-trimethylsilyl) amide (241 mg., 1 mM) was added, and stirring was continued for 1 hour at room temperature. The reaction mixture was poured into 2N hydrochloric acid (100 ml.), stirred for 5 minutes, and extracted with ethyl acetate. The extracts were washed with water, dried and the solvent was removed to give crude product (482 mg.). Recrystallisation gave betamethasone 17-valerate as pale yellow crystals whose infra-red spectra resembled those of authentic material (173 mg., 36%).

EXAMPLE 20

Reaction of betamethasone 21-valerate with lithium dimethyl cuprate in dimethoxyethane Betamethasone 21-valerate (500 mg) was reacted with lithium dimethyl cuprate following the general procedure described in Example 4 except that dry dimethoxyethane was used in place of dry T.H.F. The reaction mixture was stirred for 1½ hours at −20°30'3¼ hours at −20°, allowed to warm up to room temperature, with stirring over 2 hours and stirred at room temperature for 2 hours. The reaction mixture was worked up as described in Example 4 and the product recrystallised from methanol to give betamethasone 17-valerate (250 mg), $\lambda_{max}$ 236.5 n.m. ($\epsilon$ 14,800), with i.r. spectra resembling those of authentic material.

Preparation of betamethasone 17-substituted-benzoates Preparation of starting materials General Reaction Procedure 21-Desoxy-21-iodobetamethasone, the appropriate benzoic acid (2.5 mole equivs) and triethylamine (2 mole equivs) were refluxed in acetone (10 ml per mmole steroid) for 90 minutes when t. l. c. showed reaction to be complete. The reaction mixture was concentrated under reduced pressure and then poured slowly into water with good mechanical stirring. The resulting white precipitate was extracted with ethyl acetate and the extracts washed with sodium bicarbonate solution, water and then dried (MgSO$_4$); evaporation to dryness gave the crude product which was recrystallised twice from chloroform-methanol to give white crystalline products which were dried in vacuo to give the analytical samples of the 21-benzoates.

21-Benzoates prepared by the above procedure:

Betamethasone 21-p-chlorobenzoate (82%), as a methanol solvate m.p. 204°−207° (Kofler), $[\alpha]_D + 166°$ (c 0.89, dioxan), $\lambda$ max 240 nm ($\epsilon = 34,240$).

Betamethasone 21-o-nitrobenzoate (52%), m.p. 224° − 234° (Kofler), $[\alpha]_D + 100°$ (c 0.91, dioxan), $\lambda_{max}$ 235 nm ($\epsilon = 21,110$).

Betamethasone 21-o-fluorobenzoate (80%), m.p. 207° – 210° (Kofler), $[\alpha]_D$ + 146° (c 0.985, dioxan), $\lambda_{max}$ 228 nm ($\epsilon = 24,800$).

Betamethasone 21-p-fluorobenzoate (50%), $\lambda_{max}$ 233 nm ($\epsilon = 27,700$).

Betamethasone 21-p-methoxybenzoate (47%), double m.p. 140° – 143°, 220° – 223° (Kofler), $[\alpha]_D = 177°$ (c 1.06, dioxan), $\lambda_{max}$ (in ethanol) 254 nm ($\epsilon = 30,070$).

Betamethasone 21-o-acetoxybenzoate (71%), m.p. 189° – 195° Kofler), $[\alpha]_D$ + 134° (c 1.02, dioxan), $\lambda_{max}$ 233 nm ($\epsilon = 23,620$).

Betamethasone 21-o-hydroxybenzoate m.p. 219° – 228° (Kofler), $[\alpha]_D$ + 167° (c 0.87 dioxan), $\lambda_{max}$ 238.5 nm ($\epsilon = 25,430$), $\lambda_{max}$ 306 nm ($\epsilon = 4,665$).

Rearrangement of betamethasone 21-substituted benzoates to 17-benzoates with lithium dimethyl copper General Procedure The reaction was carried out under an atmosphere of dry nitrogen. Methyl lithium (ca. 2.5 equivs) in ether (ca.4 ml) was added to a suspension of cuprous iodide (1.0 g.) in dry T.H.F. (20 ml) at 0° until only a very slight yellow precipitate remained. After stirring at 0° for 15 minutes the solution was cooled to −30° and a solution of the betamethasone 21-(substituted) benzoate (1 mmole) in dry T.H.F. (10 ml) was added. After stirring for 30 minutes at −25° to −30°, N,N,N′,N′-tetramethylethylene diammonium tetrachlorocuprate (1.60 g) was added and the mixture stirred at room temperature for 60 minutes. Aqueous ammonium chloride (50 ml) was added and the mixture stirred for 15 minutes and then extracted with ethyl acetate. The extract was filtered through Kieselfuhr, washed successively with sodium thiosulphate and water and then dried (MgSO$_4$). The solvent was removed and the solid recrystallised three times from acetone-petrol to give the analytical sample of the betamethasone 17-(substituted) benzoate as white crystals.

Betamethasone 17-substituted benzoates prepared by the above procedure:

EXAMPLE 21

Betamethasone 17-p-chlorobenzoate (32%), m.p. 191° – 194° (Kofler), $[\alpha]_D$ + 60° (c 0.88, dioxan), $\lambda_{max}$ 240 nm ($\epsilon = 31,640$) $\lambda_{infl}$ 281 nm ($\epsilon = 1,275$).

EXAMPLE 22

Betamethasone 17-o-nitrobenzoate (15%), m.p. 194° –196° (Kofler), $[\alpha]_D$ − 15.8° (c 1.02 dioxan), $\lambda_{max}$ 235 nm ($\epsilon = 20,640$).

EXAMPLE 23

Betamethasone 17-o-fluorobenzoate m.p. 209° – 213° (Kofler), $[\alpha]_D$ + 62.6° (c 1.03 dioxan), $\lambda_{max}$ 230 nm ($\epsilon = 27,840$).

EXAMPLE 24

Betamethasone 17-p-fluorobenzoate (42%), m.p. 194°–196° (Kofler), $[\alpha]_D$ + 61.6° (c 0.92 dioxan), $\lambda_{max}$ 234 nm ($\epsilon = 30,570$).

EXAMPLE 25

Bethamethasone 17-p-methoxybenzoate (48%), m.p. 206° – 216° (Kofler), $[\alpha]_D$ + 61.4° (c 0.96 dixoan), $\lambda_{max}$ 258.5 nm ($\epsilon = 25,640$), $\lambda_{infl}$ 270 nm ($\epsilon = 18,010$).

EXAMPLE 26

Rearrangement of betamethasone 21-o-acetoxybenzoate

When betamethasone 21-o-acetoxybenzoate was treated with lithium dimethyl copper as described above two major products were obtained which were separated by preparative thin layer chromatography, developing three times with 8:1 chloroformacetone. Elution of the faster moving fraction with ethyl acetate gave a colourless crystalline solid which was recrystallised twice from acetone-petrol and identified as betamethasone 17-o-hydroxybenzoate (10%), m.p. 212°–217° (Kofler), $[\alpha]_D$ + 41.3° (c 0.97 dioxan), $\lambda_{max}$ 240 nm ($\epsilon = 26,790$), $\lambda_{max}$ 310 nm ($\epsilon = 4,973$).

Elution of the slower moving component with ethyl acetate gave a gum which was recrystallised twice from acetone-petrol to give betamethasone 17-o-acetoxybenzoate (12%) as an acetone solvate m.p. 143°–153° (Kofler), $[\alpha]_D$ + 40.8° (c 0.93 dioxan), $\lambda_{max}$ 233.5 nm ($\epsilon = 25,670$).

EXAMPLE 27

Rearrangement of betamethasone 21-o-hydroxybenzoate

The reaction procedure was carried out by the general method outlined above. The reaction was worked up after 110 minutes. Thin layer chromatography showed that a large proportion of starting material remained and comparative t. l. c. showed that the product formed was identical with an authentic sample of betamethasone 17-o-hydroxybenzoate.

EXAMPLE 28

Rearrangement of betamethasone 21-valerate to betamethasone 17-valerate using lithium t-butoxymethylcuprate A solution of t-butanol (0.09 ml, 1 mmole) in dry tetrahydrofuran (5 ml) was stirred under dry nitrogen at 0° and treated with 1.8 M methyl lithium in ether (0.56 ml, 1 mmole). Stirring was continued at 0° for 5 minutes and the temperature was allowed to rise to 15° during 20 minutes then dry cuprous chloride (99 mg, 1 mmole) was added. After 5 minutes the mixture was cooled to −50° to −60° and more 1.8 M methyl lithium in ether (0.56 ml, 1 mmole) was added: the mixture was stirred at this temperature for a further 5 minutes then treated with a solution of 9α-fluoro-11β, 17-dihydroxy-16β-methyl-21-valeryloxy pregna-1,4-dieme-3,20-dione (238 mg, 0.5 mmole) in dry tetrahydrofuran (5 ml). The reaction mixture was stirred at −50° to −60° for 2¼ hours then poured into 2N-sulphuric acid (50 ml) and stirred for 10 minutes. The mixture was diluted with ethyl acetate and filtered through Kieselguhr: the organic phase was separated and the aqueous phase was extracted twice with ethyl acetate. The combined organic extracts were washed with water, dried (MgSO$_4$) and evaporated under reduced pressure to a white foam (251 mg), shown by thin layer chromatography on silica in chloroformacetone (4:1) to contain ca 20% starting 21-valerate in addition to the 17-valerate. Two recrystallizations, first from ether then from acetone gave colourless crystals (149 mg, 63%) of 9α-fluoro-11β,21-dihydroxy-16β-methyl-17-valeryloxy-pregna-1,4-diene-3,20-dione, whose p.m.r spectrum resembled that of an authentic specimen.

EXAMPLE 29

Rearrangement of betamethasone 21-valerate to betamethasone 17-valerate using potassium t-butoxide A solution of potassium t-butoxide (113 mg, 1 mmole) in dry tetrahydrofuran (5 ml) was stirred at −33° under dry nitrogen and treated with a solution of 9α-fluoro-11β-17-dihydroxy-16β-methyl-21-valeryloxypregna-1,4-diene-3,20-dione (238.5 mg, 0.5 mmole) in dry tetrahydrofuran (5 ml) during 5 minutes. The mixture was stirred for 1 hour at −35° to −40° then treated with glacial acetic acid (0.284 ml, 10 mmole). After being kept at ca − 20° for 10 minutes the cloudy white solution was poured into water (100 ml): the product was extracted with ethyl acetate and the combined organic extracts were washed with water, dried (MgSO$_4$) and evaporated under reduced pressure to a colourless foam (234 mg). The material was dissolved in chloroform and subjected to preparative-layer chromatography on silica in chloroform then in chloroform-acetone (20:1) elution with ethyl acetate afforded 9α-fluoro-11β,21-dihydroxy-16β-methyl-17-valeryloxypregna-1,4-diene-3,20-dione as a colourless foam (40 mg 16,8%), $\lambda_{max}$ (ethanol) 239 nm ($E_{1cm}^{1\%}$ 307), whose infrared and p.m.r. spectra resembled those of authentic material.

EXAMPLE 30

17-Acetoxy-9α-fluoro-11β,21-dihydroxy-16β-methyl pregna-1,4-diene-3,20-dione a. Methyl lithium (2.5 ml of a ca 1.7 m solution in ether) was added to a suspension of cuprous iodide (0.5 g) in dry tetrahydrofuran (THF) (10 ml) under nitrogen at 0°. The mixture was stirred at 0° for 15 minutes to give a clear solution of lithium dimethylcuprate, which was cooled to −30°. Betamethasone 21-acetate (434 mg) in dry THF (10 ml) was added and the reaction was stirred at −30° for 45 min, it was then poured into iced N-sulphuric acid and allowed to stand at room temperature for 1 hour, the precipitate (840 mg) was filtered off and the filtrate was extracted with ethyl acetate (100 mg). The precipitated material and extract were combined and refluxed in ethyl acetate, the insoluble material was removed by filtration and the filtrate was evaporated to dryness to leave a residue (500 mg), m.p. 231° -236°.

This was crystallised from acetone-petrol (b.p. 40–60) to give the title compound (360 mg), m.p. 242° − 247° (decomp).

b. The lithium dimethylcuprate reagent was prepared as previously described in (a), betamethasone 21-acetate (434 mg) in dry THF (10 ml) was added and the reaction stirred at −30° for 45 minutes. Glacial acetic acid (0.58 ml) was added and the cooling bath was removed. After 5 minutes the reaction mixture was poured into water and the steroid (385 mg), m.p. 235° -240° was extracted with ethyl acetate. Crystallisation from acetone-petrol (b.p. 40°–60°) gave the title compound (330 mg) m.p. 241° -243° (decomp).

c. The lithium dimethylcuprate reagent was prepared as in (a), betamethasone 21-acetate (434 mg) in dry THF (10 ml) was added and the reaction was stirred at −30° for 45 minutes. p-Toluene sulphonic acid (ca 1.7 g) dissolved in THF (10 ml) was added and isolation as worked up as described in (b) gave a yellow solid (430 mg), which on crystallisation from acetone-petrol (b.p. 40°–60°) gave the title compound (300 mg), m.p. 238°–241°.

EXAMPLE 31

9α-Fluoro-17-formuloxy-11β,21-dihydroxy-16β-methylpregna-1,4-diene-3,20-dione

Methyl lithium (2.5 ml of a ca 1.7 M solution in ether) was added to a suspension of cuprous iodide (0.5 g) in dry THF (10 ml) under nitrogen at 0°. The mixture was stirred at 0° for 15 minutes and then cooled to −30° and betamethasone 21-formate (420 mg) dissolved in dry tetrahydrofuran (10 ml) was added. The reaction mixture was stirred at −30° for 60 minutes, glacial acetic acid (0.58 ml) was added, the cooling bath was removed and the reaction mixture was stirred for a further 5 minutes. It was then poured into water and the sterioid was extracted with ethyl acetate. Crystallisation from methyl acetate-petrol (b.p. 40°–60°) then acetone-petrol (b.p. 40°–60°) gave the title compound (50 mg), m.p. 198° − 201°, p.m.r. (in DMSOd$_6$) J 1.79 (s, 17—OCOH).

EXAMPLE 32

The reaction of betamethasone 17-valerate with potassium t-butoxide

The 17-valerate (476 mg) was dissolved in dry T.H.F (10 ml) under a stream of nitrogen. Potassium t-butoxide (dried, 123 mg) was added, and the mixture was stirred for 2 hours at room temperature, and poured into 2N sulphuric acid. Ethyl acetate extraction, and preparative layer chromatography gave 9α-fluoro-11β,20-dihydroxy-16β-methyl-3-oxo-pregna-1,4,17(20)-triene-21-al (isomer B, 144 mg. 38%) which was crystallised from methanol to give pure material identical with the product of Example 3c.

Betamethasone 21-formate

A solution of betamethasone (18 g) in formic acid (98–100%, 300 ml) was treated with p-toluene-sulphonic acid (1.6 g) and stood at room temperature for 2.5 hours. The mixture was poured into water and filtered to give the title compound (16 g) as fine needles, m.p. 129° (decomposition $\alpha_D$ + 110° (c 1.1).

We claim:

1. A process for the preparation of 17α-carboxylate or neutral phosphate or carbonate esters of 17α,21-dihydroxy-20-oxo-steroids which comprises reacting a 21-carboxylate or neutral phosphate or carbonate ester of a 17α,21-dihydroxy-20-oxo-steroid with a non-hydroxylic base in an anhydrous aprotic medium to remove a proton selectively from the 17α-hydroxyl grouping without elimination of the 17α-oxygen function, and subsequently neutralising or acidifying the reaction mixture whereby the intermediate product is protonated to produce the desired 17α-ester.

2. A process as claimed in claim 1 wherein the base is a carbanionoid base.

3. A process as claimed in claim 2 wherein the base is a lithium alkyl.

4. A process as claimed in claim 2 wherein the base is a lithium diloweralkyl cuprate, an alkali metal triloweralkyl cobalt, an alkali metal triloweralkyl manganese, or a lower-alkyl lithium.

5. A process as claimed in claim 4 wherein the base is lithium dimethyl cuprate, lithium trimethyl cobalt, lithium trimethyl manganese, methyl lithium or n-butyl lithium.

6. A process as claimed in claim 1 wherein the base is an alkali metal amide base.

7. A process as claimed in claim 6 wherein the base is an alkali metal bis-(triloweralkyl-silyl)amide, or an alkali metal amide carrying one or two alkyl or cycloalkyl groups as N-substituents.

8. A process as claimed in claim 7 wherein the base is lithium or sodium bis-(trimethyl-silyl)-amide, lithium diethylamide, lithium N-isopropylcyclohexyl-amide, lithium dicyclohexylamide or lithium diisopropylamide.

9. A process as claimed in claim 1 wherein the base is an alcoholate or phenolate base.

10. A process as claimed in claim 9 wherein the base is potassium tert-butoxide.

11. A process as claimed in claim 1 wherein the neutralisation or acidification of the reaction mixture is effected in an anhydrous medium.

12. A process as claimed in claim 2 wherein the neutralisation or acidification of the reaction mixture is effected in an aqueous medium.

13. A process as claimed in claim 1 wherein the said 17α,21-dihydroxy-20-oxo-steroid contains at least one of the following substitents: hydroxy groups or oxo-groups or protected hydroxy or oxo groups at at least one of positions 3- and 11-; at least one of an alkyl group or a halogen atom at at least one of positions 2- and 6-; a halogen atom at at least one of the 9α-, 11β-or 9α, 12α-positions; an alkyl group or an alkylidene group at the 16-positions and an alkyl group at at least one of the 10-, 13- and 21-positions.

14. A process as claimed in claim 1 wherein the said 17α,21-dihydroxy-20-oxo-steroid is hydrocortisone, cortisone, dexamethasone, beclomethasone, betamethasone, prednisolone, prednisone, 16β-methyl-$\Delta^8$-prednisolone, 11-dehydrobetamethasone, 6α-bromo-betamethasone or 9α-fluoro-16-methylene-prednisolone.

15. A process as claimed in claim 1 wherein the said 21-ester used as starting material is an aliphatic, cycloaliphatic, araliphatic or aromatic carboxylate ester.

16. A process as claimed in claim 15 wherein the said 21-ester is an alkanoate ester; an alkanoate ester, the alkyl radical of which is substituted by at least one halogen atom or by a morpholino group; a cycloalkylalkanoate or cycloalkanoate ester; an aralkanoate ester; or a monocyclic aromatic carboxylate ester.

17. A process as claimed in claim 16 wherein the said 21-ester is a $C_{1-6}$ alkanoate ester; a $C_{4-12}$ cycloalkyl-alkanoate or cycloalkanoate ester; or an aralkanoate ester, the 21-ester group containing 1 to 6 carbon atoms in the aliphatic moiety and a monocyclic aromatic moiety.

18. A process as claimed in claim 17 wherein the said 21-ester is an acetate, propionate, iso-butyrate, n-butyrate, tert-butylacetate, valerate, pivalate, morpholinoacetate, trichloroacetate, cyclohexylcarboxylate, adamantoate, or benzoate ester.

19. A process as claimed in claim 2 wherein the base is a lithium loweralkyl loweralkoxy cuprate or a lithium loweralkyl cyano cuprate.

20. A process as claimed in claim 2 wherein neutralisation or acidification of the reaction mixture is effected using anhydrous acetic acid or p-toluenesulphonic acid.

21. A process as claimed in claim 1 and wherein the reaction mixture is treated with water after said neutralisation or acidification.

22. A process as claimed in claim 17 wherein the said 21-ester is a formate, p-chloro-benzoate, o-acetoxy-benzoate, o- or p-fluoro-benzoate, o-nitro-benzoate, o-hydroxy-benzoate or p-methoxy-benzoate.

23. A process for the preparation of a steroid having the grouping

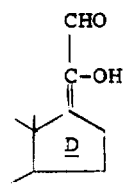

comprising reacting a corresponding steroid 17-ester with a nonhydroxylic base in an anhydrous medium and subsequently neutralising or acidifying the reaction mixture whereby the desired steroid compound is produced.

* * * * *